Nov. 15, 1966  A. E. HETTEEN  3,285,676
RUBBER TRACK
Filed Oct. 28, 1964  3 Sheets-Sheet 1
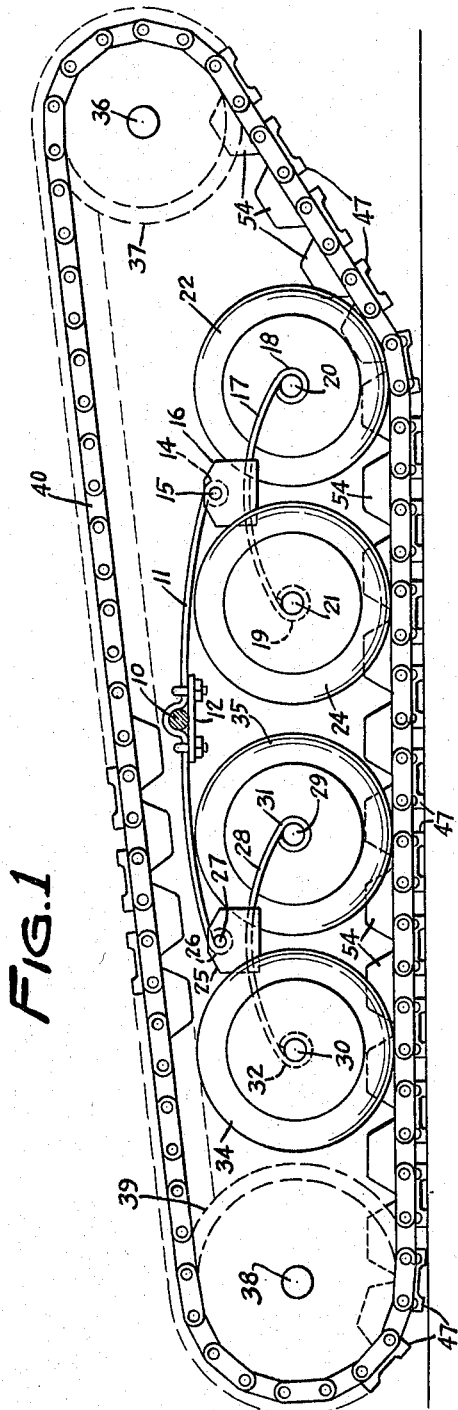
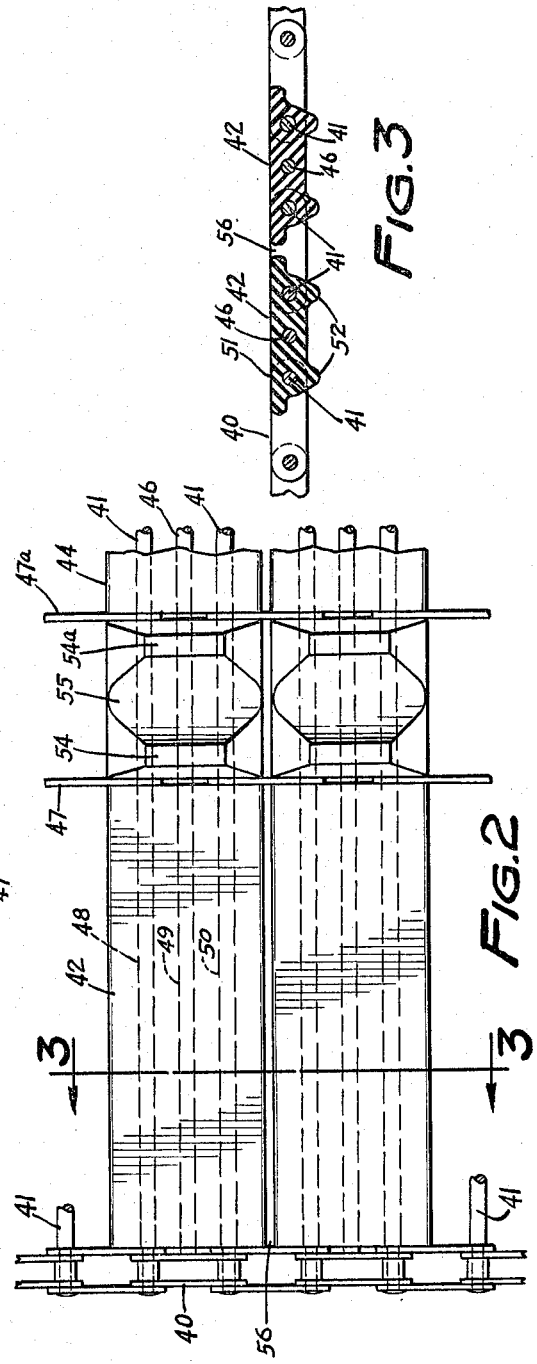
INVENTOR.
ALLAN E. HETTEEN
BY
Moore, White & Burd
ATTORNEYS

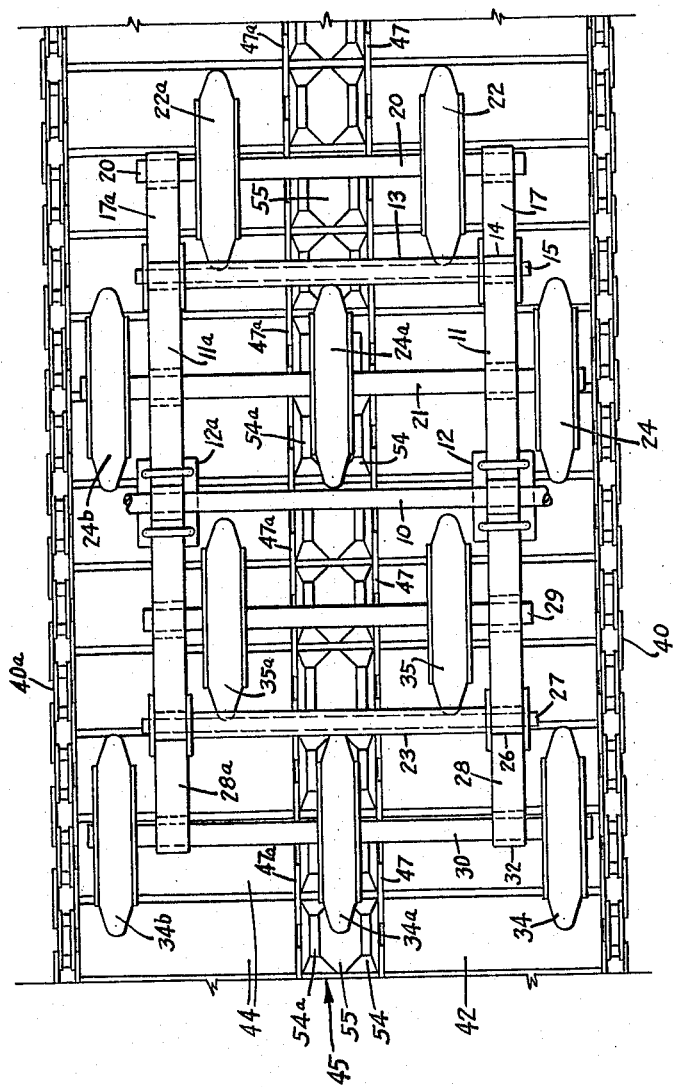

Nov. 15, 1966  A. E. HETTEEN  3,285,676
RUBBER TRACK
Filed Oct. 28, 1964
3 Sheets-Sheet 3
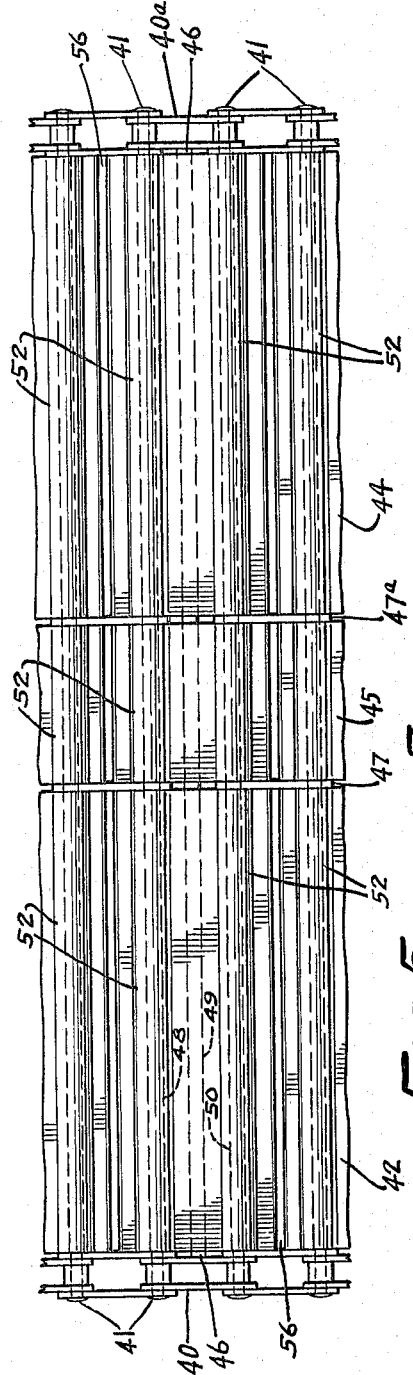
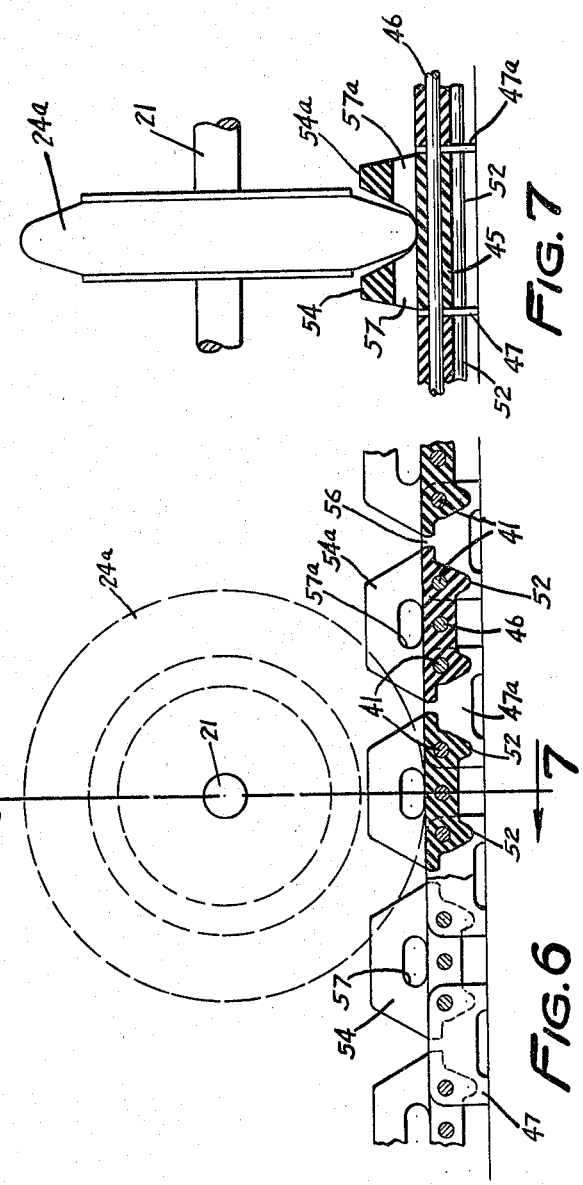
INVENTOR.
ALLAN E. HETTEEN
BY
Moore, White & Bird
ATTORNEYS

United States Patent Office 3,285,676
Patented Nov. 15, 1966

3,285,676
RUBBER TRACK
Allan E. Hetteen, Roseau, Minn., assignor to Polaris Industries, Inc., Roseau, Minn., a corporation of Minnesota
Filed Oct. 28, 1964, Ser. No. 407,026
16 Claims. (Cl. 305—27)

This invention is an endless track or tread for powered sleds used under snow and ice conditions primarily. It is of novel construction in that it is made up of roller type chains for use with sprockets which chains embrace either side of a group of rubber tread bars or members which are secured together by means of rods extending through apertures in the ends of the links of the roller type chains and longitudinal openings in the tread bars. This construction permits using parts that are made up in advance which can be then assembled into tracks of any desired length, the roller chains being shortened or lengthened by adding or removing links.

Another novel feature of the structure lies in the guiding tread bar members which engage bogie wheels to hold the tread aligned with the frame of the unit for which the tread is provided.

Still another novel feature of this rubber tread structure is that it provides openings at intervals for the dispersal of snow that may otherwise accumulate in the tread.

Yet another novel feature provided by this structure is the provision of ice grousers or gripping cleats that may be inserted into the track or omitted therefrom as desired.

Powered sleds are not in themselves novel, but they have only recently been manufactured in a form that makes them widely available to individuals as distinguished from elaboratory outfitted arctic exploring expeditions or businesses operating in arctic areas. Generally speaking, the earlier units that were made employed endless treads made up of bars or the like extending laterally between driving elements secured thereto by special fittings mounted on the chains. Other units have provided molded rubber treads which have driving chains or the like molded directly into them. All of these prior treads have had drawbacks not the least of which with respect to the molded tread being the necessity of making it a specific size for a specific machine. For this reason, molds for every size of machine had to be provided.

With respect to the chain and metal cross bar treads, the shortcomings consist primarily of a substantial expense in manufacturing such a tread although the problem with respect to length is not a serious one as the chains can be altered in length by standard techniques well known in the art. A greater shortcoming of this particular tread bar was the fact that it tended to be rough riding, particularly when going over icy, or other frozen unyielding areas such as those occasional times when it is operated over a bare ground surface. These treads also tended to be rather heavy and cumbersome which restricted the speeds at which the units could be operated or in the alternative required very rugged construction.

Accordingly, it is the principal purpose of this invention to provide a novel endless rubber tread employing novel structure to achieve the best features of all previous tread systems.

Specifically, it is an object of this invention to provide a rubber tread that may be altered in length easily.

It is a further object of this invention to provide a rubber tread which provides a ready means for including or omitting grippers or cleats known as ice grousers therein.

It is a further object of this invention to provide a rubber tread which has openings therein to allow dispersal of snow to prevent accumulation.

It is a still further object of this invention to provide a relatively light rubber tread that can be operated at comparatively high speed.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 1 is a side elevation of the invention with broken lines showing hidden parts and continuation of repeated parts;

FIGURE 2 is an enlarged fragmentary portion of the track in plan view viewed from the inside of the track; broken lines illustrating hidden parts;

FIGURE 3 is a fragmentary sectional view taken on the line and in the direction of the arrows 3—3 of FIGURE 2; FIGURE 3 is drawn to the same scale as FIGURE 2;

FIGURE 4 is a partial plan view of the lower half of the track and the track support members with broken lines showing hidden parts and portions of the device broken away to illustrate its construction more fully; it is drawn to the same scale as FIGURE 1;

FIGURE 5 is an enlarged bottom view of a fragment of the track structure with broken lines showing hidden parts; it is drawn to a scale between that used in FIGURES 1 and 4 and 2 and 3;

FIGURE 6 is an enlarged fragmentary partially sectional view of a fragment of the track and one support wheel drawn to a scale used in FIGURE 2; and FIGURE 7 is a vertical sectional view taken on the line and in the direction of the arrows 7—7 of FIGURE 6 and with a bogie wheel shown in front elevation in relation thereto; it is drawn to the same scale as FIGURE 6.

Referring to the drawings and specifically to FIGURE 1 the central spring support shaft 10 is secured to the central spring 11 by any suitable clamping structure such as the one represented at 12. Since the device is viewed in side elevation, only one such spring element 11 shows but in fact there are at least two of such elements as may be seen in FIGURE 4 where element 11A may be seen corresponding to 11. As many of these central spring elements as may be necessary can be inserted. They are all secured to the central support shaft 10.

Referring again to FIGURE 1, an eye 14 is formed in the forward end of spring element 11 which in turn embraces a shaft 15 that is secured to a shackle assembly 16 in order to receive a forward spring element 17. The ends of spring element 17 are suitably secured, as by the eyes 18 and 19, to the axles 20 and 21 respectively. On each of the axles, are mounted two or more bogie wheels such as the one shown at 22 in relation thereto on axle 20 and 24 on axle 21.

The rear end of spring 11 at the left as viewed in FIGURE 1 is secured to the shackle assembly 25 in any suitable manner as by the eye 26 embracing the shaft element 27. Shackle assembly 25 is secured to spring element 28 which in turn is suitably secured to each of the axles 29 and 30, by suitable means such as the eye 31 around axle 29 and the eye 32 around axle 30. Again two or more bogie wheels such as the ones represented at 34 for axle 30 and 35 for axle 31 are mounted on the axles for rotational movement.

The entire bogie wheel assembly of course is secured via central support shaft 10 to the framework of any vehicle for which the track assembly is to provide the traction and support in part. Since support shaft 10 may be secured to any suitable frame in a conventional manner, however, neither the frame nor the method of securing it is illustrated nor described herein.

At the forward end of the bogie wheel assembly is a forward axle 36 to which is secured a pair of cog wheels the position of which is illustrated at broken lines 37 in FIGURE 1. At the rear of the assembly is an axle 38 which in turn has cog wheels secured to it represented with broken lines at 39. The track or tread assembly itself is reeved around the sprocket wheels with a link chain such as the one represented at 40 at each side of the tread serving to engage the sprockets at each end of the structure.

The bogie wheels, of course, engage and support the tread between the sprocket wheels in order to provide continuous traction over a substantial area.

The roller chains such as the one shown at 40 in FIGURE 1 and having its counterpart seen at 40A in FIGURE 4, are roller type chains except that the links have hollow pins at their ends instead of the usual roller. Roller chains may be used if the roller supporting rivets are hollow. The entire assembly (and for brevity the chains may be referred to as roller chains hereafter) and the intervening rubber tread bar portions are secured together by means of rods as those shown in fragment 41 in FIGURE 2 in a manner to be described hereinafter.

The tread bars comprise several groups, here three by way of illustration, one group being those shown at 42 in FIGURE 2, a second substantially identical group a fragment of which appears at 44 in FIGURE 2 and an intermediate or central group shown at 45 in FIGURE 2. Intermediate of the rods 41 which extend through the apertured members at the ends of the roller links as well as the tread bars to hold the whole assembly together are the intermediate rods or stiffening members 46 which extend through the rubber tread elements, but not the chains, to provide additional support for the rubber tread bars between the two securing rods.

At each side of tread bar link group 45 and serving as links between the rods 41 in adjacent edges of each of the tread bars are the ice grouser links 47 and 47A respectively in FIGURE 2. These may also be seen extending below the track at 47 in FIGURE 1. On an icy surface the ice grouser links 47 provide traction at the center of the track for digging into and gripping the ice. In snow of course these elements are of such small section that they merely sink in and the weight of the vehicle rests on the rubber tread bar elements. Each tread bar element is provided with three longitudinally extending openings represented by the broken lines 48, 49 and 50 in FIGURE 2. It is through these longitudinally extending openings that the rods 41 and 46 extend. The grouser links 47 of course are pierced also to receive the rods 41.

As seen in FIGURE 3, the rubber tread bar elements of group I (those designated 42) are seen to have a flat inner side 51 and underside having downwardly longitudinally extending ridges 52 which serve to grip and provide traction in soft materials such as snow, slush or even mud. The ends of the rods 41 and 46 may be seen in section in FIGURE 3 also. The tread bars of group II, shown in fragment and designated 44 in FIGURE 2, have a cross-sectional identical to those in group 42.

Group 45, however, have raised portions 54 and 54A respectively which define a transversely extending channel 55 in each of the tread bars on the inner or bogie wheel facing the side. Channel 55 engages and the raised portions 54 and 54A embrace a central bogie wheel at various stations along the tread as the preferred form of structure providing interacting elements on the track and supporting wheel means for keeping the tread centered on the bogie wheels and the driving sprockets 37 and 39.

Turning now to FIGURE 4, the entire bogie wheel support system may be seen in plan as though the upper portions and ends of the track illustrated in FIGURE 1 had been removed and the remaining portion is viewed from the top. The main support shaft 10 and its spring clamps 12 and 12A support the main springs 11 and 11A which in turn support the shafts 15 and 27 respectively. Shaft 15 supports spring 17 and 17A and shaft 27 springs 28 and 28A; these latter springs supporting in turn the shafts or axles for the wheels. In FIGURE 4, also, are shown suitable spacer means such as the tubes 13 and 23 that may embrace respectively the shafts 15 and 27 to hold the main spring assemblies for the opposite sides of the track in proper relationship to each other.

These axles are 20, 21 for spring 17 and 29, 30 for springs 28, 28A. It will be noted that the axles 20 and 20 each have just two wheels on them at 22 and 22A for axle 20 and at 34 for axle 29. Axle 21, however, has three wheels 24, 24A and 24B. Axle 30 is provided with the wheels 34, 34A and 34B. The wheels 24A and 34A both lie in the center of the track and engage the channel 55 formed by the raised elements 54 and 54A on each of the center tread bar elements 45, as mentioned above.

In FIGURE 5, a portion of the tread assembly showing the groups of tread bars 42, 44 and 45 held between the chains 40 and 40A are clearly distinguishable. Gripping ridges 52 may be seen at the edges of each of these tread units and broken lines represent the channels 48, 49 and 50. The heads formed on the rods 41 may be seen at the extreme edges of the chains 40 and 40A which keep the rods 41 from being withdrawn or accidentally moving in either direction with relation to the chain structure. At 46 the ends of the stiffening rods for the tread bars may also be seen abutting the connector links of chains 40 and 40A. This is the means by which the stiffening rod 46 is held centered within the tread bars. The ice grouser links 47 and 47A also appear in this figure. It will be noticed that while the tread bars in all the groups come reasonably close together, there is a space indicated at 56 between the edge of any one aligned tread bar series extending transversely across the track and the adjacent tread bar series. This is important in a track of this nature that is intended for use primarily on snow to permit the working of snow through the track.

Turning now to FIGURE 6 wherein a partial section through the center portion of the track is seen enlarged, the raised members in the elevated portions 54 and 54A forming the channel within which the broken line representation of a wheel engages may be seen. This is wheel 24A here to illustrate the relationship that would be true of either wheel 24A or wheel 34A. Ice grouser links 47 and 47A also appear clearly together with the ends of rods 41 and 46.

The gripping ribs 52 also are clearly shown in FIGURE 6, and it will also be noticed that the space 56 again appears clearly between any two adjacent groups of aligned tread bars. In this enlarged view also, is shown a modification in the form of openings 57 that may be provided in the elevated portions 54 and 54A. These openings are designated 57, 57A respectively for raised portions 54 and 54A. Openings 57 and 57A are provided to permit lateral discharge of snow that may enter channel 55. If not provided an easy access route, such snow might perhaps build up disastrously therein.

In FIGURE 7, the arrangement of the openings 57 and 57A extending laterally from channel 55 to the outside of the center group 45 of the rubber tread bars is clearly visible. It will also be seen that wheel 24A is tapered toward its periphery and that the channel 55 is a tapered channel whereby any tendency of the wheel to crawl out of the channel tends to be counteracted, and the wheel will drop back to the center always providing a wedging action toward the outside of any snow that may get in channel 55.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. An endless track comprising: a pair of spaced apart corresponding roller type chains for use with sprockets having links, rubber tread bars positioned between said roller type means, said roller type chains having apertures extended through the ends of their links, said rubber tread bars having passageways extended longitudinally therethrough and spaced the same distance as the apertures in said roller type chain links, rods extended through and secured in the apertures of said roller type link chains and said longitudinal passageways in said tread bars whereby said roller type chains are secured together and said tread bars are supported therebetween, said rubber tread bars having at least one longitudinal opening therein positioned intermediate of said passageways and a stiffening member inserted in said longitudinal opening in each of said rubber tread bars and held therein by links of said roller type chains at both ends.

2. The endless track of claim 1 in which said rubber tread bars have projecting gripping ribs formed near each longitudinal marginal edge.

3. The endless track of claim 1 in which at least some of said rubber tread bars have members thereon extending toward the inside of said endless track to engage and interact with track centering means.

4. An endless track comprising, at least two spaced apart roller type chains having links with apertures extending transversely through the ends thereof, a first set of rubber tread bars placed adjacent one of said roller chains and extended transversely thereof toward and stopping short of the other of said roller type chains, a second corresponding set of rubber tread bars having one end adjacent the other of said roller type chains and extended transversely thereof toward and stopping short of the near end of said first set of rubber tread bars, a corresponding number of middle rubber tread bars positioned intermediate between said first and second rubber tread bars and in alignment therewith, all of said tread bars having aligned longitudinally extending openings therein at least part of which match the apertures in said roller type chain link, rods extending through the apertures in one set of links through all of said rubber tread bars and through the corresponding aperture in the chain links of said other roller type chain, and center links extending across the space between each set of bars formed by one of each of said first, second and middle sets of tread bars, said center links pivotally embracing rods at the sides of adjacent sets of tread bars and extending between the middle tread bar and the adjacent tread bars of each of said first and second groups, whereby said center links provide a hinged connection between adjacent sets of aligned tread bars intermediate of said roller type chains.

5. The endless track of claim 4 in which said third tread bars have raised portions thereof to cooperate with structure on the unit for which the endless track is provided to aid in keeping the track centered thereon.

6. The endless track of claim 5 in which said raised portions are opposed, spaced apart portions forming a channel of decreasing width at its bottom, and openings formed in said raised portion extending transversely of a completed track.

7. The endless track of claim 4 in which said rubber tread bars have at least one longitudinally extending opening that is misaligned with the apertures at the ends of said links of said roller type chains, and stiffening members inserted in these misaligned longitudinal openings.

8. An endless track assembly comprising, a forward axle, two spaced sprockets on said forward axle, a rear axle, two spaced sprockets on said rear axle, two roller type chains having links, each of said chains reeved around a sprocket on each of said forward and rear axles, a first group of rubber tread bars having one end abutting one of said chains and extending toward and stopping short of the space between said roller type chains, a second set of tread bars corresponding to said first set of tread bars and having one end abutting the other of said roller type chains and extending toward and stopping short of the center of said space between said roller type chains in alignment with the tread bars of said first group, a third group of tread bars arranged between said first and second groups of tread bars and corresponding in number thereto and in alignment therewith, pierced ice grouser links arranged on each side of said third group of tread bars and with their ends interleaved between tread bars of said third group and tread bars of each of said first and second groups and extending between adjacent ones of said third group of tread bars forming links therebetween; said tread bars having longitudinally extending openings therethrough; the openings in said tread bars aligning with the piercings of said pierced ice grouser bars; said links of said roller type chains having apertures through the ends thereof which apertures are aligned with at least some of said longitudinal openings extending through said tread bars, and rods extending through the apertures in said link rollers and the openings in said tread bars to secure said roller type chains, tread bars and ice grousers link into an articulated homogeneous track structure, a support means intermediate of said forward and rear axle, main springs centrally supported by said support means, a support pivotally supported by each end of said main springs, forward secondary springs supported at their centers by the supports on the forward end of said main springs and having axle securing means at each end thereof, axles supported by each of said secondary spring axle securing means and bogie wheels rotatably mounted on each of said axles, corresponding support, second spring, axle and wheel structure supported by the rear end of said main spring, all of said bogie wheels engaging the inside of said rubber tread bars.

9. The endless track of claim 8 in which there are means extending toward the inside of said track from at least some of said tread bars and engaging opposite sides of at least some of said bogie wheels to keep said track aligned with said bogie wheels and said sprockets.

10. The structure of claim 9 in which said means extending toward the inside of said track comprise raised portions at the edges of said third group of rubber tread bars forming a channel therebetween, said channel having a cross-sectional shape to be complimentary to that of said bogie wheels.

11. The structure of claim 10 in which said raised portions of said third group of rubber tread bars have transversely extending openings therein.

12. The structure of claim 11 in which said openings have one edge coincident with the bottom of said channel.

13. The structure of claim 8 in which the bogie wheels on adjacent axles are misaligned longitudinally in relation to each other.

14. The structure of claim 8 in which said center links are ice grousers having portions extending beyond the outside of said track, and said rubber tread bars have gripping portions extending longitudinally near each edge thereof.

15. The structure of claim 8 in which said rubber tread bars have at least one opening each that does not correspond to the apertures of said roller type chain links, and stiffening elements in said non-corresponding openings and retained therein by portions of said roller type chains.

16. A method of stiffening intermediate portions of rubber tread bars forming an endless track by being secured between two roller type chains comprising, forming openings in said rubber tread bars intermediate their points of attachment to said roller type chains, and having the ends of said openings align with imperforate chain portions, inserting stiffening members in said openings before securing said rubber tread bars between said roller type chains; whereby said stiffening members are trapped in said rubber tread bars.

References Cited by the Examiner

UNITED STATES PATENTS

| | | | |
|---|---|---|---|
| 1,341,761 | 6/1920 | Putnam | 305—58 X |
| 1,737,150 | 11/1929 | Davis | 305—35 X |
| 2,061,229 | 11/1936 | Fergusson | 305—36 |
| 2,118,736 | 5/1938 | Odom | 74—254 X |
| 2,608,935 | 9/1952 | Moore | 305—58 X |
| 2,859,068 | 11/1958 | Larsson | 305—27 |
| 3,023,824 | 3/1962 | Bombardier | 305—27 X |
| 3,164,416 | 1/1965 | Hetteen et al. | 305—35 X |

BENJAMIN HERSH, *Primary Examiner.*

R. J. JOHNSON, *Assistant Examiner.*